United States Patent
Xun

(10) Patent No.: US 10,216,019 B2
(45) Date of Patent: Feb. 26, 2019

(54) METHOD AND APPARATUS FOR PROVIDING A DISPLAY ASSEMBLY HAVING MULTIPLE DISPLAYS

(71) Applicant: Google Technology Holdings LLC, Mountain View, CA (US)

(72) Inventor: Xiaodong Xun, Palatine, IL (US)

(73) Assignee: Google Technology Holdings LLC, Mountain View, CA (US)

(*) Notice: Subject to any disclaimer, the term of this patent is extended or adjusted under 35 U.S.C. 154(b) by 1022 days.

(21) Appl. No.: 14/243,941

(22) Filed: Apr. 3, 2014

(65) Prior Publication Data
US 2015/0185528 A1 Jul. 2, 2015

Related U.S. Application Data

(60) Provisional application No. 61/921,832, filed on Dec. 30, 2013.

(51) Int. Cl.
*G02F 1/1333* (2006.01)
*G02F 1/1335* (2006.01)

(52) U.S. Cl.
CPC ........... *G02F 1/1333* (2013.01); *G02F 2001/133531* (2013.01); *G02F 2001/133601* (2013.01); *G02F 2201/44* (2013.01)

(58) Field of Classification Search
CPC ............ G09G 5/00; G02F 1/1333; G02F 2001/133531; G02F 2001/133601; G02F 2201/44
USPC .......................................................... 349/69
See application file for complete search history.

(56) References Cited

U.S. PATENT DOCUMENTS

| | | | |
|---|---|---|---|
| 7,446,835 B2 | 11/2008 | Ukawa | |
| 7,745,986 B2 | 6/2010 | Ito et al. | |
| 8,514,347 B2 | 8/2013 | Kim et al. | |
| 2001/0052949 A1* | 12/2001 | Yamaguchi et al. | ............ 349/39 |
| 2007/0109468 A1* | 5/2007 | Oku | ............................. 349/110 |
| 2010/0220090 A1* | 9/2010 | Plut | ....................... G06F 1/3218 345/211 |
| 2011/0050545 A1* | 3/2011 | Namm | ..................... G09G 3/20 345/5 |
| 2013/0044282 A1* | 2/2013 | Kuwabara et al. | ............ 349/96 |
| 2013/0248834 A1* | 9/2013 | Seki | .................... H01L 27/3223 257/40 |

FOREIGN PATENT DOCUMENTS

JP 2006-308897 A 11/2006

OTHER PUBLICATIONS

International Search Report and Written Opinion for PCT Patent Application No. PCT/US2014/071957, dated Apr. 2, 2015, 13 pages.
First Office Action with English translation for Chinese Application No. 201480071813.8, dated Mar. 26, 2018, 22 pages.

* cited by examiner

*Primary Examiner* — Charles Chang
(74) *Attorney, Agent, or Firm* — Brake Hughes Bellermann LLP

(57) ABSTRACT

A method and apparatus performed by an electronic device for operating a display assembly of the electronic device includes a display assembly having an externally-lit display with first and second polarizing layers and a backlighting source. The first polarizing layer is positioned between the backlighting source and the second polarizing layer. The display assembly also includes a self-lit display positioned between the first and second polarizing layers of the externally-lit display.

20 Claims, 7 Drawing Sheets

METHOD AND APPARATUS FOR PROVIDING A DISPLAY ASSEMBLY HAVING MULTIPLE DISPLAYS

RELATED APPLICATIONS

This application is a non-provisional application of commonly assigned U.S. Provisional Patent Application No. 61/921,832, filed on Dec. 30, 2013, from which benefits under 35 USC § 119(e) are hereby claimed and the contents of which are hereby incorporated by reference herein.

FIELD OF THE DISCLOSURE

The present disclosure relates to a display assembly and more particularly to a display assembly of an electronic device, which includes an externally-lit display and a self-lit display.

BACKGROUND

The display serves as a centerpiece for modern-day mobile communication devices. As electronics, such as smartphones, phablets, and tablets, continue to evolve through increasing levels of performance and functionality, so have their displays to allow for their effective operation. Increasingly, mechanical controls are giving way to touch-sensitive displays. Larger, high-resolution displays allow devices to simultaneously present a user with a greater number of controls for immediate access to specific functions. Users also favor larger displays with higher resolutions for multimedia applications that are now being integrated into a large number of communication devices.

With larger, high-resolution displays comes a greater need for power to illuminate the displays. Accordingly, finding ways to prolong battery life becomes an important consideration. One such way of prolonging battery life includes the technique of placing an electronic device in a sleep mode. Even though an electronic device is in sleep mode, notifications of pending emails, voicemails, and such, should be accessible to a user in a power efficient manner.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
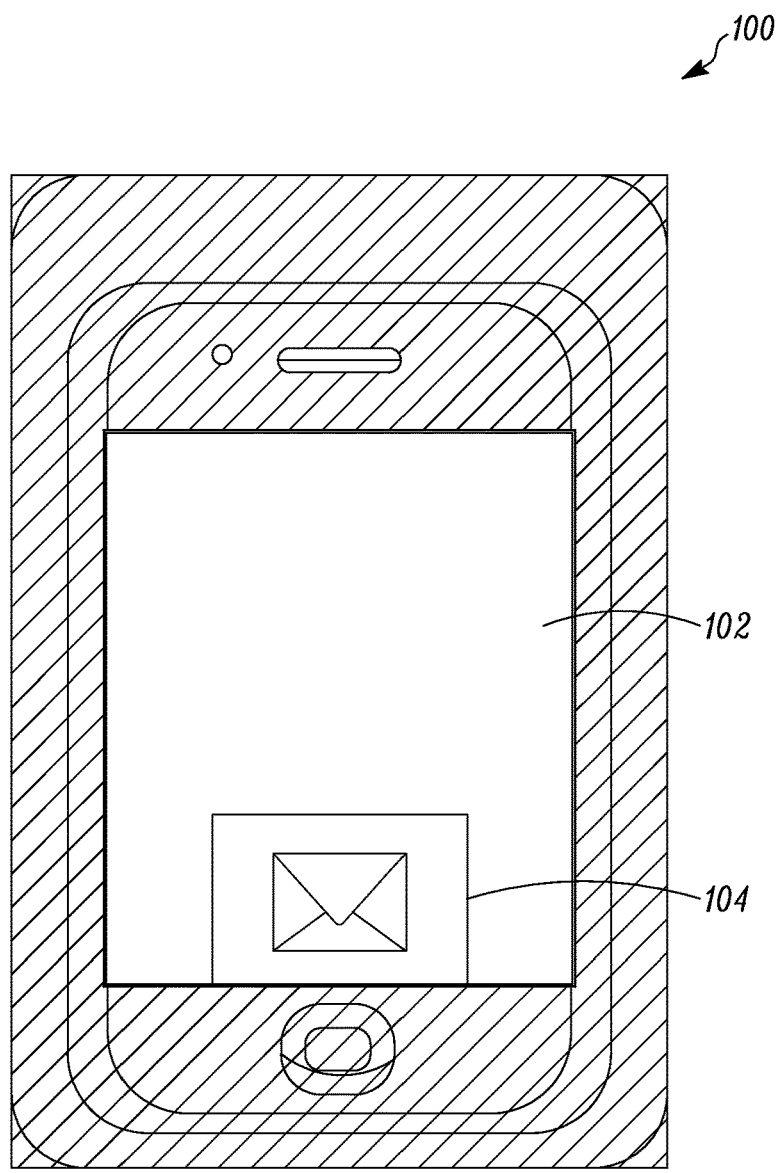
FIG. 1 is a schematic diagram of an electronic device configured with a display assembly in accordance with some embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, the present disclosure provides for a display assembly. The display assembly includes an externally-lit display having first and second polarizing layers and a backlighting source. The first polarizing layer is positioned between the backlighting source and the second polarizing layer. The display assembly also includes a self-lit display positioned between the first and second polarizing layers of the externally-lit display. An externally-lit display is defined as a display that includes or is illuminated using a backlighting source. Whereas the self-lit display is defined as a display that is illuminated without a backlighting source.

Also in accordance with the teachings herein is a method performed by an electronic device for operating a display assembly of the electronic device. The method includes powering down a liquid crystal display having first and second polarizing components and a backlighting source. The first polarizing component is positioned between the backlighting source and the second polarizing component. In at least one embodiment, the method also includes displaying an image using an organic light emitting diode area that is positioned between first and second polarizing layers of the liquid crystal display while the liquid crystal display is powered down.

Further in accordance with the teachings herein is a method of manufacturing a display assembly. The method includes stacking a first polarizing layer over a backlighting source and stacking a self-lit display over the first polarizing layer. The method also includes stacking a bottom glass layer over the self-lit display and stacking a liquid crystal layer over the bottom glass layer. The method further includes stacking a top glass layer over the liquid crystal layer and stacking a second polarizing layer over the top glass layer.

Referring now to the drawings, and in particular FIG. 1, an electronic device (also referred to herein simply as a device) configured to implement embodiments in accordance with the present teachings is shown and indicated generally at 100. Specifically, device 100 represents a smartphone that has a primary visual display 102 (also referred to herein simply as a display) and a secondary visual display 104, each configured to display images to a user of the device 100. As will be later described, components within the device 100 are configured to project images onto the primary visual display 102 and/or to display images using the secondary visual display 104. Although this example shows the secondary visual display 104 in a particular location within the primary visual display 102, in other embodiments the device 100 is configured with the secondary visual display 104 in other locations of the primary visual display 102. Further, as will be described later, in other embodiments there are two or more secondary visual displays 104.

The electronic device 100 is further configured to enter sleep or low power mode, which as defined herein is a mode of operation that enables the device 100 to enter an operational state to conserve power over a normal or awake operating state for the device. As the device enters a sleep mode, the device powers down but does not power off. In a sleep mode, for example, the device suspends some operations and/or cuts power to some of its hardware components such as a main or application processor, while maintaining some functionality using, for instance, a secondary or lower power processor. The device 100 in the sleep mode further provides just enough power to components such as random access memory (RAM) to maintain the data needed to resume normal operations.

When in the sleep mode, however, the device 100 can be configured to listen for commands and receive indications that may be of interest to the user of the device. For example, the device 100 may receive an indication that an email is pending for the user. In order to notify the user of the pending email, the device 100 is configured to communicate an icon to the user, such as the email icon displayed using the secondary visual display 104. In one embodiment, the device 100 is configured to display this indication while the device 100 is in the sleep mode, in other embodiments this icon is displayed in the secondary visual display 104 when the device 100 is in a mode other than the sleep mode. In this embodiment, the primary display 102 is used to display images when the device 100 is in an awake or normal operating mode.

While a Smartphone is shown at 100, no such restriction is intended or implied as to the type of device to which these teachings may be applied. Other suitable devices include, but are not limited to: phablets; tablets; personal digital assistants (PDAs); portable media players (e.g., MP3 players); electronic book readers; personal global-positioning-system (GPS) receivers; wearable electronic devices, such as devices worn with a wristband; cameras; camcorders; displays for computerized machinery (e.g., computer numerical control (CNC) machines and automobiles); automated teller machines (ATMs); kiosk terminals; and vending machines. For purposes of these teachings, an electronic device can be any device that includes an illuminable display.

Figure 2:
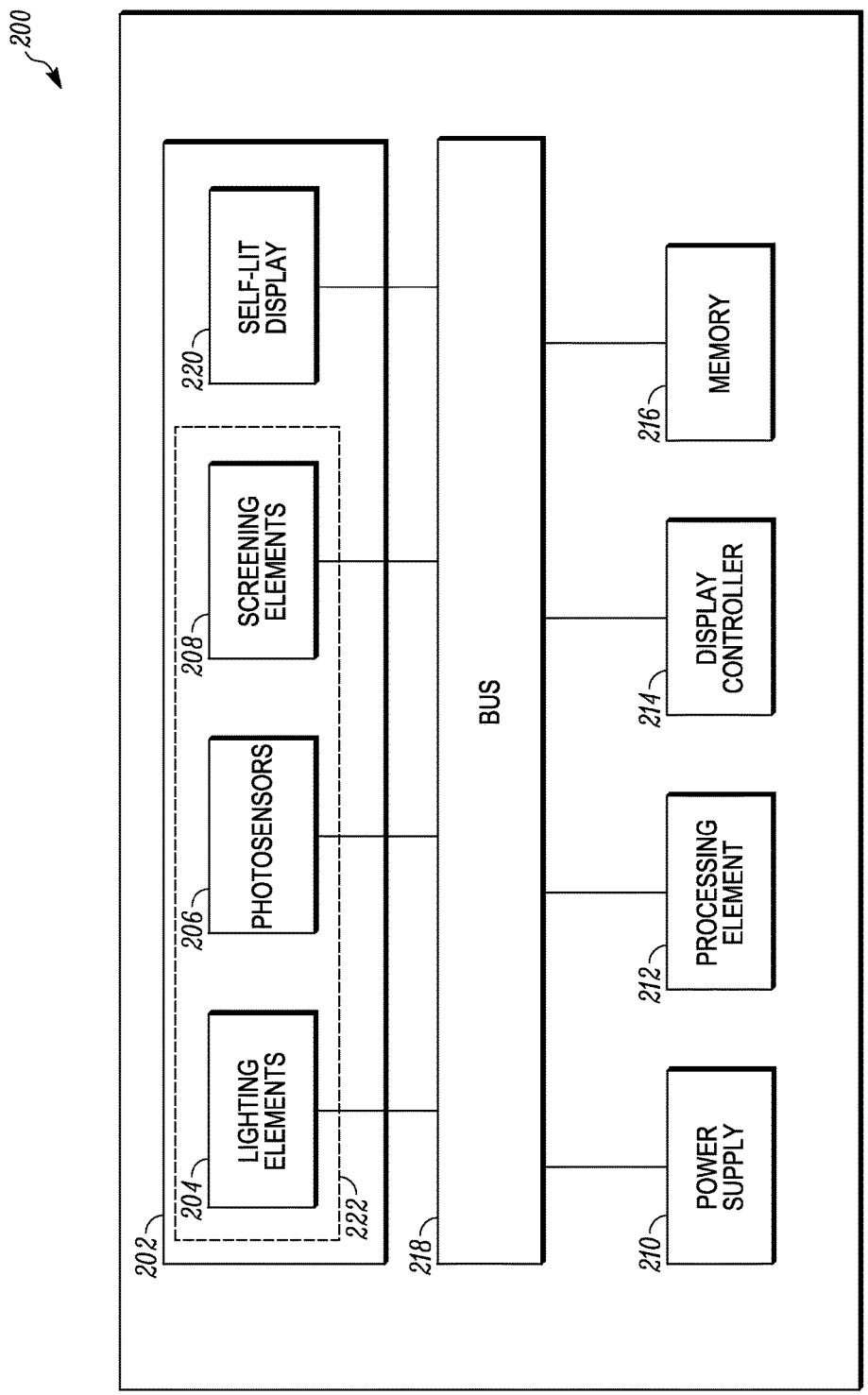
FIG. 2 is a block diagram of some internal hardware elements of an electronic device configured with a display assembly in accordance with some embodiments of the present teachings.

Referring to FIG. 2, a block diagram illustrating some internal hardware elements of an electronic device in accordance with embodiments of the present teachings is shown and indicated generally at 200. For one embodiment, the block diagram 200 represents some of the internal elements of the device 100. Specifically, the internal hardware components 200 include: a display assembly 202; a power supply 210; a processing element 212; a display controller 214; and memory 216, which are all operationally interconnected, and in communication with one another, by way of one or more internal communication links, for instance an internal bus 218. The display assembly 202, also referred to herein simply as a display, can be used to alternately project images in the primary visual display 102 and/or the secondary visual display 104 shown in FIG. 1. To alternately display or project images means that both the primary and secondary displays are operated at different times, and both are not powered simultaneously in or to display images on the display assembly.

The display assembly 202 includes an externally-lit display 222 that functions as the primary display 102 and a self-lit display 220 that functions as the secondary visual display 104. In the embodiment shown, the externally-lit display 222 includes lighting elements 204, photosensors 206, and screening elements 208. However, in some embodiments, the photosensors 206 may be absent. A limited number of device elements 202, 204, 206, 208, 210, 212, 214, 216, 218, and 220 are shown at 200 for ease of illustration, but other embodiments may include a lesser or greater number of such elements in a device. Moreover, other elements needed for a commercial embodiment of a device that incorporates the elements shown at 200 are omitted from FIG. 2 for clarity in describing the enclosed embodiments.

We turn now to a brief description of the device elements shown in the block diagram 200. In general, display assembly 202, the display controller 214, and the processing element 212 are configured with functionality in accordance with embodiments of the present disclosure as described in detail below with respect to the remaining FIGS. 3-7. "Adapted," "operative" or "configured," as used herein, means that the indicated elements are implemented using one or more hardware devices such as one or more operatively coupled processing cores, memory elements, and interfaces, which may or may not be programmed with software and/or firmware as a means for the indicated elements to implement their desired functionality. Such functionality is supported by the other hardware shown in FIG. 2, including the device elements 210, 216, and 218.

Continuing with the brief description of the device elements shown at 200, as included within the electronic device 100, the display controller 214 controls the operation of the externally-lit display 222 and the self-lit display 220 one at a time. The self-lit display 220 has no backlighting source to enable illumination. The lighting elements 204 of the display assembly 202 are a plurality of elements, each of which is capable of generating light to illuminate the externally-lit display 222 of the display assembly 202. In a particular embodiment, the lighting elements 204 are integrated into a backlighting module also referred to herein as a backlighting source. In an example, the externally-lit display 222 is a liquid crystal display (LCD) panel, and the lighting elements 204 are light emitting diodes (LEDs) that provide backlighting for the display panel. In other embodiments, lighting elements within the backlighting source include, but are not limited to: cold cathode fluorescent lamps (CCFLs); electroluminescent films; organic light emitting diodes (OLEDs); and incandescent lamps.

Each of the lighting elements 204 has a luminosity that adds to a brightness level of the display assembly 202. As used herein, a luminosity of a lighting element is a quantitative measure of the instantaneous light output of the lighting element. Equivalently, a luminosity of a lighting element represents a flux of light energy (electromagnetic energy in the visible spectrum) passing through a hypothetical closed surface surrounding the lighting element. A luminosity level refers to a particular quantitative value for the luminosity of a lighting element. A brightness level of a display is a function of position, and as used herein, represents a quantitative measure of the instantaneous light energy density that exists at a position on the display assembly 202. Where luminosity is the total light output of a single lighting element integrated over all directions, a brightness level is a cumulative effect of light energy radiated from all the lighting elements that reaches (either directly or indirectly, such as by reflection) a single point on the display assembly 202.

Brightness levels are measured at various positions on the display assembly 202 using the photosensors 206. Each photosensor of the plurality of photosensors 206 is positioned at a location on the display assembly 202 and measures the brightness level at that location. For different embodiments, devices used as photosensors include, but are not limited to: photodiodes; bipolar phototransistors; photosensitive field-effect transistors (FET); charge-coupled devices (CCDs); reverse-biased LEDs; photoresistors; and other types of photosensitive semiconductor devices.

Screening elements 208 within the externally-lit display 222 control the amount of light radiating from the lighting elements 204 that reaches the viewable surface of the display assembly 202, when the externally-lit display 222 is turned on. As used herein, each screening element of the plurality of screening elements 208 selectively screens or blocks a portion of the light radiating from the lighting elements 204 from reaching the portion of the viewable surface of the display assembly 202 at which the screening element is located.

The transmittance of a screening element for a particular portion of the display assembly 202 can be set so that the screening element is completely transparent, allowing all light incident upon the screening element to pass through it to the surface of the display assembly 202, or the transmittance can be set so that the screening element is completely opaque, blocking all light incident upon the screening element from reaching the surface of the display assembly 202. The transparency of screening elements 208 can also be set using transmittance values that make them semi-transparent or semi-opaque, which means that some, but not all, of the light incident upon the screening elements 208 is allowed to reach the viewable surface of the display assembly 202.

Figure 3:
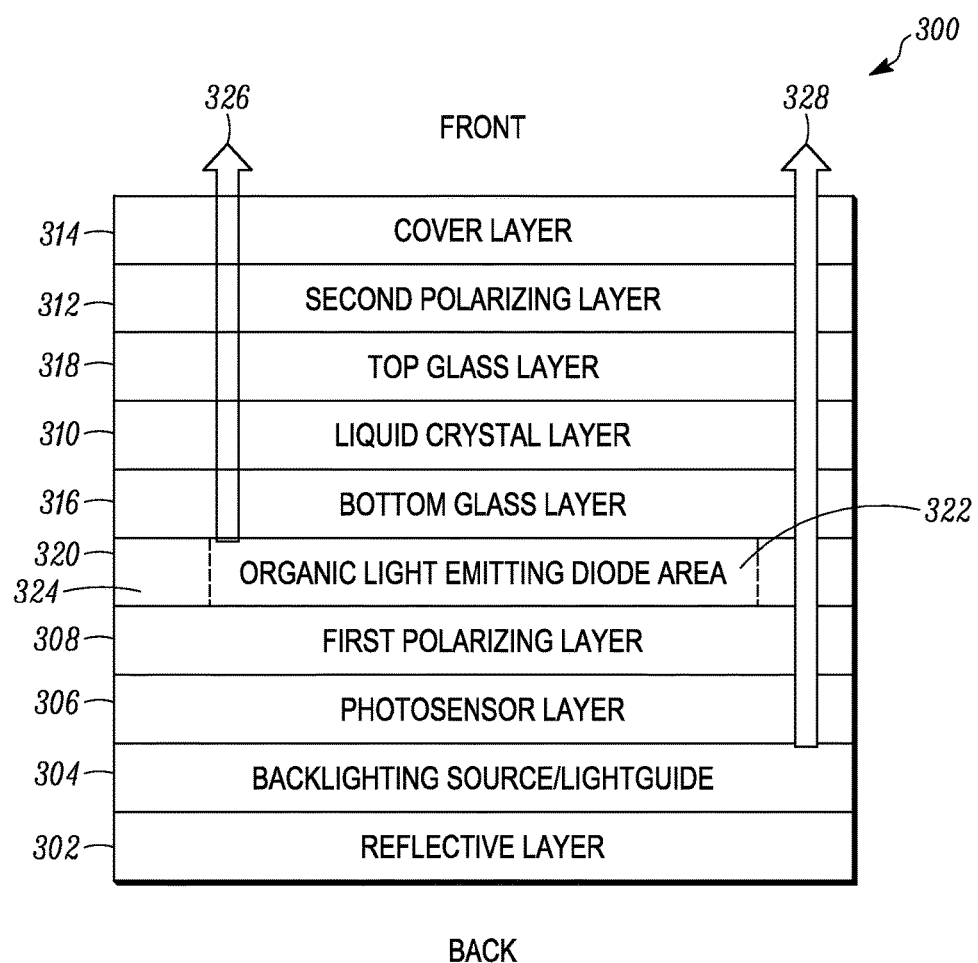
FIG. 3 is a block diagram illustrating multiple layers of a display assembly in accordance with some embodiments of the present teachings.

Turning momentarily to FIG. 3, a block diagram representing a display assembly of an electronic device consistent with embodiments of the present teachings is shown and indicated generally at 300. In the embodiment shown, the display assembly 300 includes a liquid-crystal (LC) display and a self-lit display. For described embodiments, the display assembly 300 represents the display assembly 202. The block diagram 300 shows individual layers of the display assembly 202 and how those layers combine to allow the display assembly 202 to perform its intended functionality. In one embodiment, the display assembly 300 includes: a reflective layer 302; a backlighting source/lightguide 304; a photosensor layer 306; a first polarizing layer 308; a self-lit display 320 that includes an active area 322, which in the embodiment shown is an OLED area, and an inactive area 324; a bottom glass layer 316; a liquid crystal layer 310, a top glass layer 318, a second polarizing layer 312; and a cover layer 314. The self-lit display 320 represents the self-lit display 220 of the display assembly 202. In an embodiment, layers 304, 304, 306, 308, 310, 312, 316, and 318 of the display assembly 300 represent the externally-lit display 222, in this case an LCD panel, of the display assembly 202. As mentioned above, the display controller 214 (not shown in FIG. 3) controls whether, at any given time, the self-lit display 320 or the externally-lit display is operational to display images.

Specifically, beginning at the back of the display assembly 202 shown at the bottom of the assembly 300, the liquid crystal display of the display assembly 300 includes the bottom glass layer 316, the liquid crystal layer 310, and the top glass layer 318. In one embodiment, the layers of the liquid crystal display are configured into a stacked arrangement where the first polarizing layer 308 is stacked after the backlighting source 304; the self-lit display 320 is stacked after the first polarizing layer 308; the bottom glass layer 316 is stacked after the self-lit display 320; the liquid crystal layer 310 is stacked after the bottom glass layer 316; the top glass layer 318 is stacked after the liquid crystal layer 310; and the second polarizing layer 312 is stacked after the top glass layer 318. While ten specific layers are shown at 300, alternative embodiments include different, e.g., fewer or additional layers for the display assembly of a communication device.

The backlighting source 304 includes the lighting elements 204 that illuminate the externally-lit display 222. Within the backlighting source 304, the lighting elements 204 may be arranged in different ways. Moreover, a layer of transparent material forms the lightguide (not shown). Light from the backlighting source 304 enters the lightguide and is propagated across the externally-lit display 222 within the lightguide. As a light ray within the lightguide is incident upon the upper surface of the lightguide, at an angle that is not normal to the surface of the lightguide, a portion of the light ray is refracted through the upper surface of the lightguide and goes on to illuminate the externally-lit display 222, while the remaining portion of the light ray is reflected internally and continues to propagate through the lightguide until it is again incident upon its upper surface. Adjusting the ratio of refracted light to reflected light is done by selecting a specific index of refraction for transparent material forming the lightguide, using optical coatings on the lightguide, and/or controlling the geometry of the upper surface of the lightguide.

The reflective layer 302, which is shown underneath the backlighting source 304, prevents light from the backlighting source 304 from leaking out of the backside of the externally-lit display 222. By reflecting light back into the lightguide from underneath, all or substantially all the light radiating from the lighting elements 204 is eventually directed toward the front of the externally-lit display 222, through the photosensor layer 306, making the most efficient use of available light.

The photosensors 206 are located in the photosensor layer 306. Different embodiments have different numbers of photosensors 206 and different spatial arrangements for the photosensors 206. Each photosensor 206 measures a brightness level produced by the lighting elements 204 at the location of the photosensor 206. Using a plurality of photosensors 206 results in a determination of a plurality of different brightness levels measured at different positions on the externally-lit display 222. The plurality of measured brightness levels, in turn, provide information on the status of the lighting elements 204 and the illumination they provide.

For the embodiment shown at 300, the LC layer 310 operates together with the first 308 and/or second 312 polarizing layers to perform the functionality of the screening element 208. The polarization axes of the first 308 and second 312 polarizing layers are perpendicular to one another. Light emitted by the lighting elements 204 is linearly polarized as it passes through the first polarizing layer 308. This linearly polarized light is incident on the LC layer 310, which, for an embodiment, represents a thin film of a twisted nematic liquid crystal that is circularly birefringent. The LC layer 310 is optically active and able to cause a rotation of the polarization of the linearly polarized light passed by the first polarizing layer 308. Where the LC layer 310 rotates the polarization of the linearly polarized light by 90 degrees, the light is aligned with the polarization axis of the second polarizing layer 312 and is fully passed. Where the LC layer 310 does not rotate the polarization of the linearly polarized light, the polarization remains perpendicular to the polarization axis of the second polarizing layer 312 and the linearly polarized light is blocked. The amount by which the LC layer 310 rotates the polarization for linearly polarized light is controlled by electric fields applied to different areas for the LC layer 310.

The LC layer 310 is sealed within the bottom glass layer 316 and the top glass layer 318. The LC layer 310 is divided into a plurality of areas, with each area representing and/or corresponding to a screening element of the screening elements 208. A thin-film transistor (TFT) for each area is used to control the charge, and thus the electric field, applied to each area of the LC layer 310. The electric charge applied to each area of the LC layer 310 affects the rotation of the polarization of the linearly polarized light passed by the first polarizing layer 308. In a first embodiment, each area representing a screening element 208 becomes increasingly more transparent (less opaque) with the strength of the electric field applied to the area. In a second embodiment, each area representing a screening element 208 becomes increasingly more opaque (less transparent) with the strength of the electric field applied to the area.

The cover layer 314 also referred to in the art as a lens, which can be glass or a rigid plastic, is added to the front of the display assembly 202. The cover layer 314 adds structural rigidity to the display assembly 202 and protects the more delicate components lying underneath. One or more coatings may be used on the cover layer 314 to resist scratching and/or minimize glare from reflected light. For a particular embodiment, the cover layer 314 is configured to operate as a touch screen to receive user input that is processed by the processing element 212.

The self-lit display 320 includes the organic light emitting diode area 322 (active area), which is configured to emit its own light 326. When emitting light, the OLED area 322 operates as an active area having multiple active pixels. In one example, the active area 322 emits light 326 of differing polarity which the liquid crystal layer 310 and/or the second polarizer rotates to adjust a brightness of a displayed image. A pixel, in some embodiments, is an individual picture element that is uniquely addressable and emits its own luminance. In one example, pixels are arranged and addressed in terms of one or more vectors, arrays, and/or columns. In another example, pixels are individually addressable. In still another embodiment, individual pixels are grouped into segments. Illustratively, the self-lit display 320 includes multiple groups of active pixels configured into segments for separately displaying images. In one particular example, the active area 322 of the self-lit display 320 includes multiple groups of active pixels configured for separately displaying images.

The self-lit display 320 also includes the inactive area 324, which is not configured to emit its own light. The inactive area 324 can be made of the same or a different material as the active area 322. Thus, in some examples the active and inactive areas are made of plastic, acrylic, polyester, silicone, polyurethane, halogenated plastic, or any other type of moldable synthetic or semi-synthetic organic solid. Where the active 322 and inactive 324 areas of the self-lit display 320 are made of the same material, the inactive area 324 also has a same transmittance as the active area 322. In one embodiment, the material of the inactive area 324 does not include any pixels. In another embodiment, the inactive area 324 has multiple inactive pixels. Inactive pixels may be configured to be illuminable, but are not currently illuminable. In a further embodiment, the active area 322 of the self-lit display 320 is smaller than the inactive area 324 of the self-lit display 320.

Categories of OLED displays include active-matrix OLED displays (AMOLED) and passive-matrix OLED displays (PMOLED). One difference between AMOLEDs and PMOLEDs is that the AMOLEDs are configured with a thin film transistor, such as a TFT, to activate individual pixels and/or segments in a display. Accordingly, in one embodiment, the organic light emitting diode area 322 is a passive-matrix organic light emitting diode area. In another embodiment, the organic light emitting diode area 322 is an active-matrix organic light emitting diode area. In a further embodiment, the self-lit display 320 is a monochrome display. In still another embodiment, the active area 322 includes an electroluminescent display.

The active area 322, for example, is constructed from a transparent material, such as, a transparent plastic. Thus, when the backlight 304 is powered on and the active area 322 is not powered on (e.g., not emitting light), the backlight 304 is configured to project light 328 through the self-lit display 320 including the active area 322. When the OLED area 322 and the inactive area 324 have the same light absorptive properties, the light projected from the backlight 304 onto the display assembly 202 results in a seamless image.

In another embodiment, the inactive area 324 of the self-lit display 320 is constructed from a different material than the active area 322 of the self-lit display 320. In one example, the material in the inactive area 324 is less opaque than the material of the OLED area 322, or there is no material in the inactive area 324. In such circumstances, the OLED area 322 is more opaque than the inactive area 324. Thus, when light is projected from the backlight 304 onto the display assembly 202 without compensation for the absorptive properties of the OLED area 322, the area on the display assembly 202 coextensive with the OLED area 322 has a darker hue than the rest of the display assembly 202. Accordingly, in one embodiment, in conjunction with photosensors 206, the light projected through the self-lit display 320 is adjusted so that a seamless image is projected onto the display assembly 202.

If the OLED layer is passively driven, (e.g., driven without a TFT), this adjustment entails providing a higher luminance in a first portion of the surface area of the externally-lit display (e.g., layers 310, 316, 318) that covers and is a same size as the active area of the self-lit display 320 than the luminance in the remaining surface area of the externally-lit display. Thus, for example, a portion of the backlighting source 304 coextensive with the OLED area 322 emits a higher luminance to compensate for the absorptive difference of the materials of the OLED area 322 and the inactive area 324. In another embodiment, the LC layer 310 together with the first 308 and/or second 312 polarizing layers are configured to adjust the transmittance of the screening elements 208 and/or the polarization of the light passing through the OLED area 322 to compensate for the difference in the absorptive qualities of the OLED area 322 and the inactive area 324.

In one embodiment, the self-lit display 320 is configured to have a lower resolution than the externally-lit display. In some embodiments, the LCD is used to display images on parts of the primary visual display including areas that overlap the secondary visual display. When the LCD is used to display any sized image, including a small image, the backlighting source 304 is turned on. The backlighting source 304 consumes a significant amount of power. Thus, if the electronic device displays a small image, such as an email icon, and the backlighting source 304 is turned on, the device consumes as much energy as is needed to illuminate the full visual display even though only a small area of the visual display is being illuminated. Thus, in some examples, when a small icon is projected onto the display assembly 202, the backlighting source 304 is powered down and the self-lit display 320, is used to display the icon. Because the active area 322 of the self-lit display 320 is smaller and consumes less power than the backlighting source 304, power is saved when the backlighting source 304 is powered down and only the self-lit display 320 is used. As used herein, powering down an externally-lit display, such as an LCD, means shutting down at least a portion of the externally-lit display, such as the backlighting source or liquid crystal layer, or the entire externally lit display.

Figure 4:
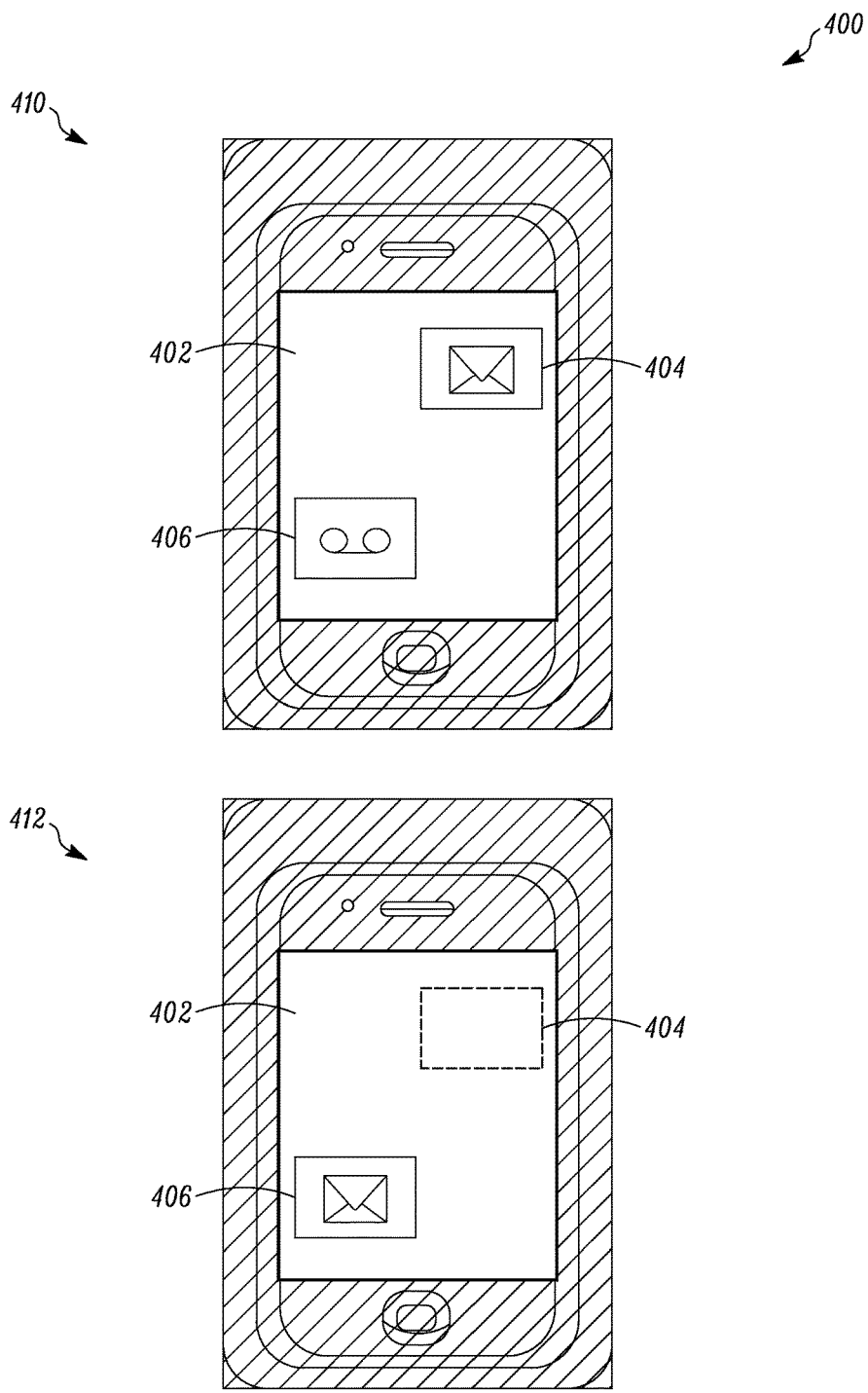
FIG. 4 is a schematic diagram illustrating an electronic device having multiple active areas of a self-lit display in accordance with the present teachings.

As the plan view of FIG. 1 illustrates, the active area 322 of the self-lit display 320, which is substantially coextensive with the secondary visual display area 104, does not extend the full width or length of the primary visual display area 102, which is coextensive with the LC layer 310. Thus, in one embodiment, the active area 322 of the self-lit display 320 is smaller than a total surface area of the externally-lit display. Further, as FIG. 4 illustrates, some embodiments include two or more active areas 322. More particularly, FIG. 4 illustrates two views 410 and 412 of a screen of an electronic device 400, which includes a primary visual display 402, e.g., an LCD and a secondary visual display, e.g., 320, having two active display areas 404, 406 in different locations on the screen. Although the example depicted in FIG. 4 shows two active display areas 404, 406, in other examples, some devices include more than two active display areas.

View 410 depicts the primary visual display 402 being powered down and both secondary visual displays 404, 406 being illuminated. For example, the device 400 is in sleep mode, wherein the backlighting source is powered down, and the primary visual display 402 is darkened. Conversely, view 412 depicts the primary visual display 402 being powered down and only the secondary visual display 406 is illuminated. However, as indicated, the secondary visual display 404 is not illuminated and is not emitting light or displaying an image, as indicated by the dashed line and the absence of an icon.

Figure 5:
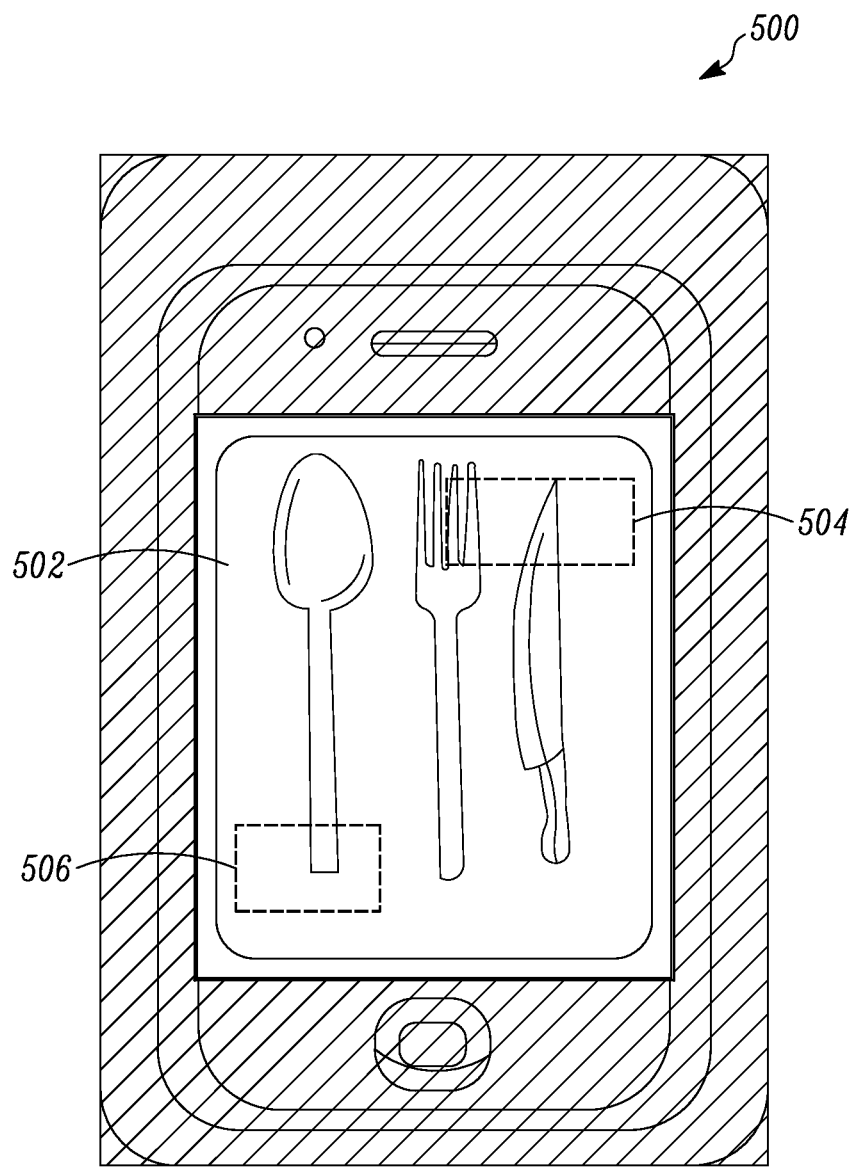
FIG. 5 is a schematic diagram of an electronic device having multiple active areas of a self-lit display in accordance with the present teachings.

FIG. 5 shows one example of an electronic device 500 having multiple secondary self-lit visual displays, e.g., 504, 506, each of which are not illuminated. For example, a backlighting source for a primary externally-lit visual display 502 is powered up and emitting light, which results in an image of silverware appearing on a screen of the electronic device 500. In this example, the self-lit displays 504, 506 are turned off, as indicated by the dashed lines. Thus, the images are not displayed using the self-lit displays 504, 506. Instead, the light from the backlighting source travels through the self-lit displays 504, 506 to project a seamless and unified image on the externally-lit display 502.

Figure 6:
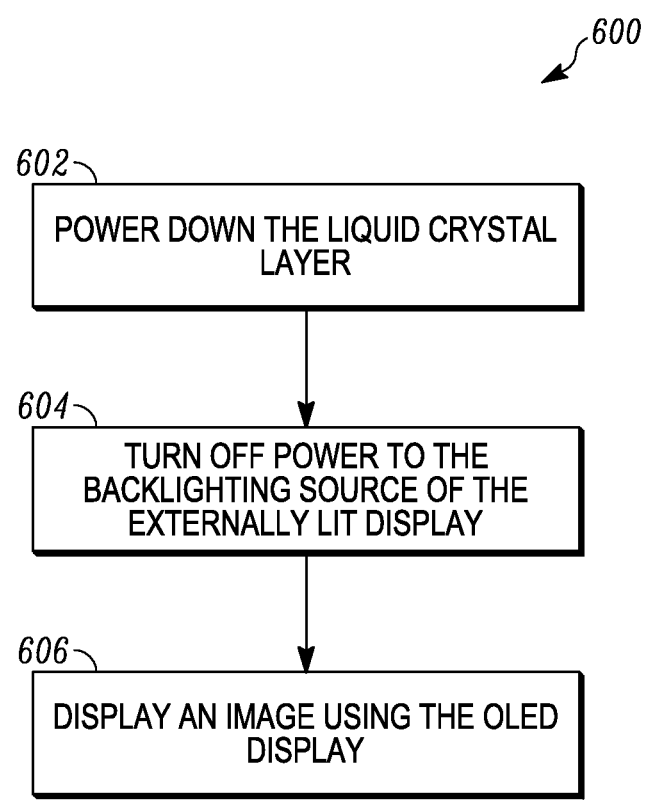
FIG. 6 is a logical diagram illustrating a method of operation of an electronic device having a display assembly that includes an externally-lit display and a self-lit display in accordance with the present teachings.

Turning now to FIG. 6, which is a logical diagram illustrating a method of operating an electronic device in accordance with the present teachings. The electronic device, in one embodiment, is configured to include the display assembly components illustrated by reference to FIGS. 1-3, which includes one or more self-lit display. In one particular example, the method 600 includes powering 602 down the liquid crystal layer, e.g., 310 and turning off 604 power to the backlighting source of the externally-lit display including first and second polarizing components. The method 600 also includes displaying 606 an image using the self-lit display, such as an organic light emitting diode display, that is positioned between first and second polarizing layers of the liquid crystal display.

In another example, power to the liquid crystal layer 310 is maintained, and power is turned off 604 to the backlighting source of the externally lit display. An image 606 is then displayed 606 using the self-lit display. When the device goes into a sleep mode, turning off the backlighting source reduces power consumption. If the device needs to present a notification while the device is in the sleep mode, the self-lit display is illuminated to, for instance, project a corresponding icon, such as an email icon.

Figure 7:
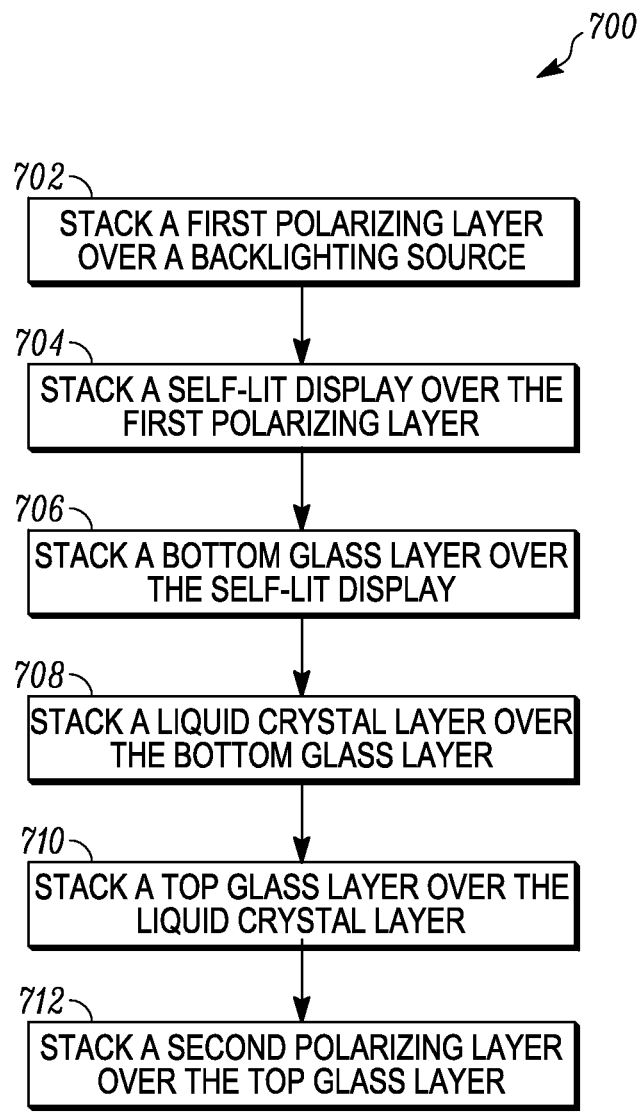
FIG. 7 is a logical diagram illustrating a method of manufacturing a display assembly that includes an externally-lit display and a self-lit display in accordance with the present teachings.

FIG. 7 illustrates is a logical diagram of a method of manufacturing an electronic device including that includes a primary and secondary visual display. The method of manufacturing the electronic device includes line assembly, batch assembly, rapid manufacturing, continuous manufacturing, or any other method of manufacturing a communication device. The method 700, in one example, includes stacking 702 a first polarizing layer over a backlighting source. The method 700 also includes stacking 704 a self-lit display over the first polarizing layer. Stacking 706 a bottom glass layer over the self-lit display is included one example of the method 700. Another example of the method 700 includes stacking 708 a liquid crystal layer over the bottom glass layer. Yet still another example of the method 700 includes stacking 710 a top glass layer over the liquid crystal layer, and stacking 712 a second polarizing layer over the top glass layer.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A display assembly comprising:
an externally-lit display comprising first and second polarizing layers and a backlighting source, wherein the first polarizing layer is positioned between the backlighting source and the second polarizing layer; and
a self-lit display positioned between the first and second polarizing layers of the externally-lit display;
wherein the backlighting source is configured to emit a higher luminance for a first portion of a surface area of the externally-lit display than for a second portion of the surface area of the externally-lit display, the first portion being a same size as an active area of the self-lit display.

2. The display assembly of claim 1, wherein the externally-lit display is a liquid crystal display.

3. The display assembly of claim 2, wherein the liquid crystal display further comprises a bottom glass layer, a liquid crystal layer, and a top glass layer, wherein the layers of the liquid crystal display are configured into a stacked arrangement, wherein:
the first polarizing layer is stacked after the backlighting source;
the self-lit display is stacked after first polarizing layer;
the bottom glass layer is stacked after the self-lit display;
the liquid crystal layer is stacked after the bottom glass layer;
the top glass layer is stacked after the liquid crystal layer; and
the second polarizing layer is stacked after the top glass layer.

4. The display assembly of claim 1, wherein the self-lit display comprises two or more organic light emitting diode areas, the two or more organic light emitting diode areas being configured to allow light from the backlighting source to travel through the areas when the self-lit display is powered down to project an image on the externally-lit display.

5. The display assembly of claim 4, wherein the organic light emitting diode area comprises at least one of a passive-matrix organic light emitting diode area or an active-matrix organic light emitting diode area.

6. The display assembly of claim 4, wherein the organic light emitting diode area is constructed from a transparent material.

7. The display assembly of claim 6, wherein the transparent material comprises a transparent plastic.

8. The display assembly of claim 1, wherein the active area of the self-lit display includes multiple active pixels.

9. The display assembly of claim 1, wherein the self-lit display further comprises an inactive area.

10. The display assembly of claim 9, wherein the inactive area comprises multiple inactive pixels.

11. The display assembly of claim 9, wherein the active and inactive areas of the self-lit display have a same transmittance.

12. The display assembly of claim 9, wherein the active area of the self-lit display is smaller than the inactive area of the self-lit display.

13. The display assembly of claim 9, wherein the active area of the self-lit display is constructed from a different material than the inactive area of the self-lit display.

14. The display assembly of claim 1, wherein the active area of the self-lit display is smaller than a total surface area of the externally-lit display.

15. The display assembly of claim 1, wherein the self-lit display comprises multiple groups of active pixels configured into segments for separately displaying images.

16. The display assembly of claim 1, wherein the self-lit display has a lower resolution than the externally-lit display.

17. The display assembly of claim 1, wherein the self-lit display is a monochrome display.

18. A method performed by an electronic device for operating a display assembly of the electronic device, the method comprising:
    powering down a liquid crystal display that includes first and second polarizing components and a backlighting source, wherein the first polarizing component is positioned between the backlighting source and the second polarizing component; and
    displaying an image using an organic light emitting diode area that is positioned between first and second polarizing layers of the liquid crystal display while the liquid crystal display is powered down.

19. The method of claim 18, wherein powering down the liquid crystal display places the electronic device in a low power mode, the low power mode being configured to disable at least one processor while continuing to operate the organic light emitting diode area and at least one other processor to detect commands and receive indications for display on the organic light emitting diode area.

20. A method of manufacturing a display assembly, the method comprising:
    stacking a first polarizing layer over a backlighting source;
    stacking a self-lit display over the first polarizing layer;
    stacking a bottom glass layer over the self-lit display;
    stacking a liquid crystal layer over the bottom glass layer;
    stacking a top glass layer over the liquid crystal layer; and
    stacking a second polarizing layer over the top glass layer,
    wherein an externally-lit display comprises the first polarizing layer, the second polarizing layer, and the backlighting source, and wherein the backlighting source is configured to emit a higher luminance for a first portion of a surface area of the externally-lit display than for a second portion of the surface area of the externally-lit display, the first portion being a same size as an active area of the self-lit display.

* * * * *